United States Patent
Sinivaara

(10) Patent No.: US 9,020,430 B2
(45) Date of Patent: Apr. 28, 2015

(54) METHODS, APPARATUS, SYSTEMS AND COMPUTER PROGRAM PRODUCTS FOR ENERGY MANAGEMENT OF SHORT-RANGE COMMUNICATION MODULES IN MOBILE TERMINAL DEVICES

(75) Inventor: Hasse Sinivaara, Espoo (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 10/963,481

(22) Filed: Oct. 12, 2004

(65) Prior Publication Data

US 2006/0079180 A1    Apr. 13, 2006

(51) Int. Cl.
H04B 7/00    (2006.01)
H04B 5/00    (2006.01)
H04M 1/725    (2006.01)

(52) U.S. Cl.
CPC .............. H04B 5/00 (2013.01); *H04B 5/0043* (2013.01); *H04B 5/0062* (2013.01); *Y02B 60/50* (2013.01); H04M 1/7253 (2013.01)

(58) Field of Classification Search
USPC ................................ 455/41.2, 412, 517, 41.1
See application file for complete search history.

(56) References Cited

U.S. PATENT DOCUMENTS

| | | | |
|---|---|---|---|
| 4,972,099 A | 11/1990 | Amano et al. | |
| 5,525,992 A | 6/1996 | Froschermeier | |
| 5,621,412 A | 4/1997 | Sharpe et al. | |
| 6,150,948 A | 11/2000 | Watkins | |
| 6,593,845 B1 | 7/2003 | Friedman et al. | |
| 6,600,422 B2 | 7/2003 | Barry et al. | |
| 6,712,276 B1 | 3/2004 | Abali et al. | |
| 2002/0067265 A1 | 6/2002 | Rudolph | |
| 2002/0094805 A1* | 7/2002 | Yano et al. | 455/414 |
| 2002/0174073 A1 | 11/2002 | Nordman et al. | |
| 2003/0114104 A1* | 6/2003 | Want et al. | 455/39 |
| 2003/0132746 A1* | 7/2003 | Cox | 324/207.26 |
| 2003/0162496 A1 | 8/2003 | Liu | |
| 2003/0162556 A1* | 8/2003 | Libes | 455/507 |
| 2004/0203381 A1* | 10/2004 | Cahn et al. | 455/41.2 |
| 2004/0242250 A1* | 12/2004 | Sasai et al. | 455/502 |
| 2006/0068751 A1* | 3/2006 | Chandra et al. | 455/343.2 |
| 2006/0179311 A1* | 8/2006 | McCorkle et al. | 713/168 |

FOREIGN PATENT DOCUMENTS

| | | | |
|---|---|---|---|
| EP | 1101697 A2 | 5/2001 | |
| EP | 1104143 A2 | 5/2001 | |

(Continued)

OTHER PUBLICATIONS

The State Intellectual Property Office of the People's Republic of China, Notification of Fifth Office Action for Application No. 200580034658.3, mailed Apr. 3, 2013, 6 pages, China.

*Primary Examiner* — Mazda Sabouri

(74) *Attorney, Agent, or Firm* — Alston & Bird LLP

(57) ABSTRACT

The methods, apparatus, systems and computer program products provide for sensing a magnetic field, emitted by a short-range communication source, to activate short-range communication modules in a mobile terminal. In addition to sensing the magnetic field, the terminal may rely on other parameters, such as operational state of the terminal, contextual information and the like, to determine if the short-range communication module should be activated. As such, the invention reduces the overall power consumption of the terminal by limiting the active state of the short-range communication module. By conserving power the mobile terminal is capable of operating for longer periods of time without requiring charging or replacement of the power supply.

65 Claims, 7 Drawing Sheets

(56) References Cited

FOREIGN PATENT DOCUMENTS

| EP | 1336858 A2 | 8/2002 |
| FI | 20030213 | 12/2003 |
| FR | 2 787 10 A1 | 6/1996 |
| WO | WO 91/10914 | 7/1991 |
| WO | WO 97/22079 | 6/1997 |

* cited by examiner

METHODS, APPARATUS, SYSTEMS AND COMPUTER PROGRAM PRODUCTS FOR ENERGY MANAGEMENT OF SHORT-RANGE COMMUNICATION MODULES IN MOBILE TERMINAL DEVICES

FIELD OF THE INVENTION

This invention relates to the energy management of battery-powered devices, and more particularly, relates to the optimization of power consumption by short-range communication modules, such as a radio frequency identification (RFID) reader, in mobile terminal devices.

BACKGROUND OF THE INVENTION

Short-range communication capability has become more prominent in a wide variety of mobile digital devices, such as cellular phones, personal digital assistants (PDAs), pagers and other mobile devices. Short-range communication provides the devices with the ability to communicate via RFID, Bluetooth®, infrared or other types of short-range communication dependent upon the type of transceiver module associated with the mobile device. Continuous active operation of short-range communication modules, however, consumes significant amounts of power. Therefore, in a typical mobile device with short-range communication capabilities the device is prone to require a larger power supply and/or more frequent charging of the power supply, as compared to the mobile device that is not equipped to communicate via a short-range communication medium. Both larger power supplies and more frequent power supply charging are not viable alternatives in the mobile environment. Larger power supplies lead to larger mobile devices, which is counter-intuitive to the general mobile concept that "smaller is better" or at least more practical. In the same regard, frequent charging of the mobile device power supply is inconvenient for the user and reduces the lifetime expectancy of the power supply.

For example, a typical low frequency RFID reader runs on a 3 Hz scan cycle; meaning that it is activated, i.e., "wakes up", once every 330 ms to check for RFID tags in the general vicinity. With current technology, this type of repetitive activation can add up to upwards of 20 percent of the power consumed by the mobile device. However, in the vast majority of instances the wake-up period results in no tags read, i.e., within the range of the RFID reader, so that the power that is consumed is unwarranted.

As such, there is a need in the industry to conserve the power in mobile devices associated with short-range communication modules to permit utilization of conventional power supplies and typical power supply charging schedules for the mobile devices. Various attempts have been made to address power management in mobile devices and particularly those devices that are associated with short-range communication.

One type of power-conserving method has been implemented for RFID short-range communication. The method involves limiting the "reading" of the RFID tag to only a portion of the tag, and if the RFID reader identifies that it has previously read the tag based upon the identification portion, the RFID reader does not read the rest of the tag. While this power-conserving method is helpful, the RFID reader still consumes more power than desired and the method does not address the problem of continual active operation.

In another recently developed power conservation method, an appropriate sensor measures the movement of the mobile device and active read operations continue while the movement of the device is unknown. When the movement of the device is identified, however, one or more of the subunits of the device is changed from an active operation mode to a sleep operation mode, where the sleep operation mode consumes less power than the active operation mode. The device then stays in the sleep operation mode while the movement of the device is known, and then changes back to the active operation mode when the movement of the device becomes unknown. Again, while this power-conserving method is helpful, the device still consumes more power than desired because the device is in an active operation mode anytime the movement is unknown, which amounts to most of the time that the device is in use due to the "mobile" nature of the device.

Thus, there is a need for techniques that permit greater conservation of power in mobile devices associated with a short-range communication so that the mobile device does not need a larger power supply or frequent power supply charging. In this regard, a need exists to develop techniques for keeping the short-range communication module active where there is a high likelihood of short-range communication exchange while keeping the short-range communication module less active when the likelihood of short-range communication is lower in order to keep the power consumption optimized. Additionally, a need exists to develop a power saving technique that automatically activates the short communication module without requiring the user of the device to interact with a user interface.

BRIEF SUMMARY OF THE INVENTION

The present invention provides techniques for greater conservation of power in mobile devices equipped with short-communication modules, such that the mobile device does not need a larger power supply or as frequent charging of the power supply as mobile devices that do not utilize the techniques of the present invention. In particular, the present invention provides for the mobile terminal to be equipped with a magnetic field sensing apparatus that detects the presence of a magnetic field, which is associated with a short-range communication. Detection of the magnetic filed provides a change in the operational state of the short-range communication module that is associated with the sensing apparatus. As such the present invention limits the operational period of the short-range communication module to only those periods in which the likelihood of the presence of a communication, such as an RFID tag, is heightened. The sensing apparatus provides for the short-range communication module to be activated/deactivated automatically without user interaction.

One embodiment of the invention is defined by a mobile terminal device. The device includes a short-range communication module and a magnetic field sensor in communication with the short-range communication module that detects a magnetic field and, in response to detection of the magnetic field, provides an operational mode-changing input to the short-range communication module. The short-range communication module may be a Radio Frequency Identification (RFID) module, a Wireless Local Area network (WLAN) module, an Infrared (IR) module, a Bluetooth® Module (i.e., a module operating in the 2.4 Giga Hertz (GHz) range) and the like. The magnetic field sensor will typically be a Hall Effect sensor, although other conventional magnetic field sensors and sensing means are also within the scope of the invention. The mobile terminal device may also include a processor in communication with the sensor and the module that determines if the sensed magnetic field requires an operational mode-changing input to the short-range communication module and provides an operational mode-changing input to the short-range communication module if the sensed magnetic field requires such. In addition to relying of the sensed magnetic field, the processor may use other terminal parameters to determine if activation of the short-range communication module is required. For example, in certain instances a magnetic field may be sensed by the device but the device may be able to ascertain, through terminal parameter analysis, that the sensed magnetic field is not being transmitted by a short-range communication source, such as an RFID tag or the like. Examples of other terminal parameters include the operational state of the terminal, contextual information related to the terminal and the like. Thus, the processor may be in communication with a contextual information module that communicates contextual information to the processor or the processor may be in communication with other terminal modules that communicate terminal parameters/information to the processor for subsequent processing.

Additionally, the processing unit may provide for assessment of the magnetic flux angle of the sensed magnetic filed. In such embodiments the magnetic flux angle may be associated with a specific short-range communication module. For example, a first magnetic flux angle may provide for activation of a RFID module, a second magnetic flux angle may provide for activation of a WLAN module and the like.

The invention is also embodied in a method for activating a short-range communication module in a mobile terminal device. The method includes the steps of detecting a magnetic field at the mobile terminal and activating the short-range communication module associated with the mobile terminal in response to detection of the magnetic field. The method may further include the step of determining if the detection of the magnetic field requires changing the operational state of the short-range communication module prior to changing the mode. Determining if the detection of the magnetic field requires changing the operational state of the short-range communication module may involve assessing secondary terminal parameters, such as the operational state of the terminal, the context of the terminal and the like. Typically, the step of detecting a magnetic field at the mobile terminal will involve using a Hall Effect sensor at the mobile terminal to detect the magnetic field, although other sensors or sensing means may be used to sense the magnetic filed and are within the bounds of the invention.

The operational mode-changing signal that is provided to the short-range communication module in response to detection of the magnetic filed may be an activation signal. The activation signal may induce the module to transmit an interrogation signal or it may induce the module to increase the frequency of interrogation signal transmissions.

The method may further include the step of deactivating the short-range communication module after a predefined time period, in order to limit the amount of power consumed by the short-range communication module. Additionally, the method may include for providing the mobile terminal device with sensory-perceptible feedback that the short-range communication module has been activated. For example, sensory-perceptible feedback may be provided in the form of vibrational feedback, audio feedback, visual feedback or the like.

In an alternate embodiment of the invention, a system for short-range communication is defined. The system includes a first mobile terminal device that includes a short-range communication module and a magnetic field sensor, such as a Hall Effect sensor or the like, in communication with the short-range communication module. The short-range communication module detects a magnetic field and, in response to detection of the magnetic field, provides an operational mode-changing input to the short-range communication module. The short-range communication module may include an RFID module, a WLAN module, an IR module, a Bluetooth® module or the like.

The system also includes a short-range communication apparatus that includes a magnetic field generator that transmits a magnetic field to the first mobile terminal device and a transponder that communicates a short-range communication to the first mobile terminal device. The short-range communication apparatus of the system embodiment may take the form of a second mobile terminal device. In such an embodiment, the antenna of the second mobile terminal device will typically serve as the magnetic field generator. Alternatively, the short-range communication apparatus may take the form of a passive or semi-passive tag device. In such embodiments, one or more magnets will typically be employed to serve as the magnetic field generator. Additionally, the short-range communication apparatus may take the form of an active tag device and, in such embodiments; the magnetic field generator may the antenna, one or more magnets or the like.

The first mobile terminal device of the system may include a processor in communication with the sensor and the module that determines if the sensed magnetic field requires an operational mode-changing input to the short-range communication module and provides an operational mode-changing input to the short-range communication module if the sensed magnetic field requires such. The processor may be in communication with a contextual information module that communicates contextual information to the processor. The processor uses the contextual information to determine if the sensed magnetic field requires an operational mode-changing input to the short-range communication module.

The operational mode-changing signal that is provided to the short-range communication module of the first mobile terminal device may be an activation signal. The activation signal may induce the module to transmit an interrogation signal or it may induce the module to increase the frequency of interrogation signal transmissions.

The invention is also embodied in a computer program product for activating a short-range communication module associated with a mobile terminal. The computer program product includes a computer-readable storage medium having computer-readable program code portions stored therein. The computer-readable program code portions includes a first executable portion capable of assessing one or more mobile terminal parameters based on receipt of a sensed magnetic field and a second executable portion capable of determining if the short-range communication module should be activated based on the sensed magnetic field and the one or more assessed mobile terminal parameters. The terminal parameters that are assessed by the first portion may include the operational state of the terminal (i.e., active, sleep mode, inactive, etc.), the context of the terminal (i.e., physical location of the terminal) or other similar parameters that are relevant to assessing the need to active the short-range communication module.

Thus, the method, terminal and computer program product of the present invention are capable of adjusting the power consumption of short-range communication modules, such as RFID, Bluetooth®, IR transceivers or the like based on sensing of a magnetic field associated with a short-range communication. The short-range communication module, therefore, uses less power because it is only activated during periods when the likelihood of a short-range communication is heightened. Due to the adjustment of power consumption, the present invention conserves power of the mobile terminals associated with short-range communications, which permits the mobile terminals to operate longer without requiring charging or replacement of the power supply. As such, the present invention provides for an energy saving process that can be implemented automatically without requiring users of the device to perform keypad or other user-interface functions associated with the device.

BRIEF DESCRIPTION OF THE DRAWINGS

Having thus described the invention in general terms, reference will now be made to the accompanying drawings, which are not necessarily drawn to scale.

Figure 1:
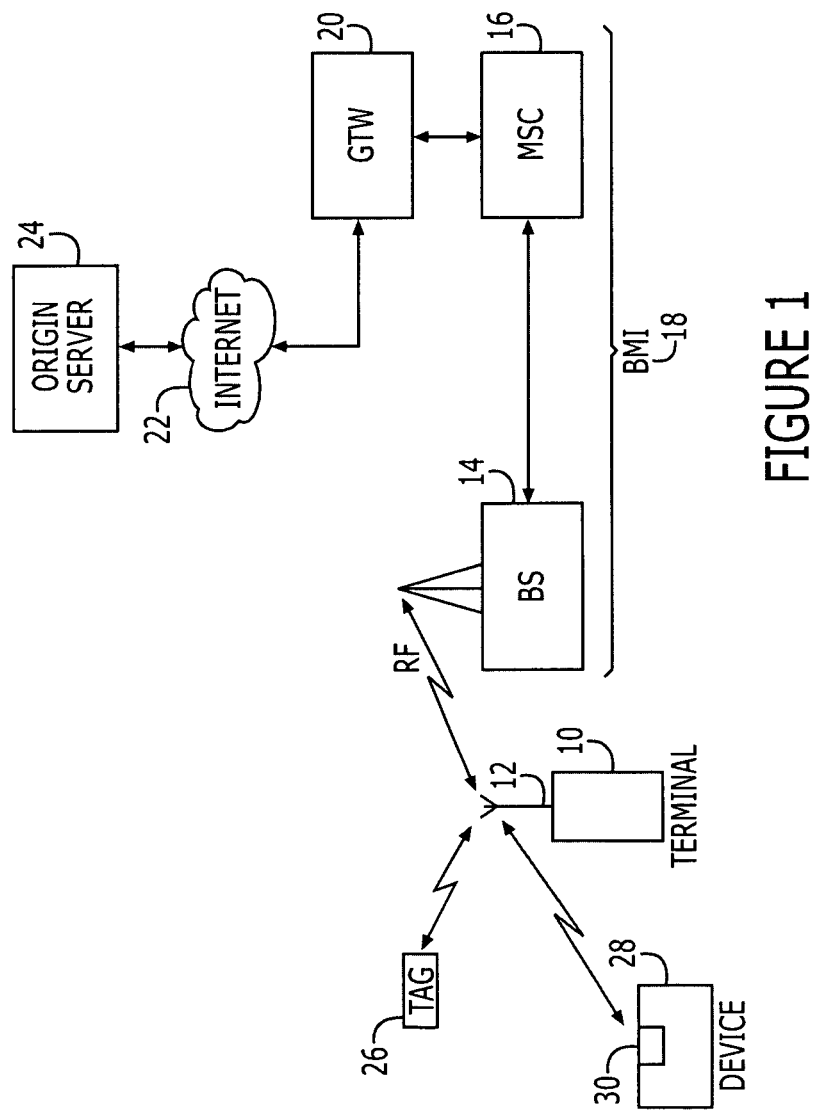

FIG. 1 is a block diagram of an exemplary communications network that would benefit from embodiments of the present invention.

Figure 2:
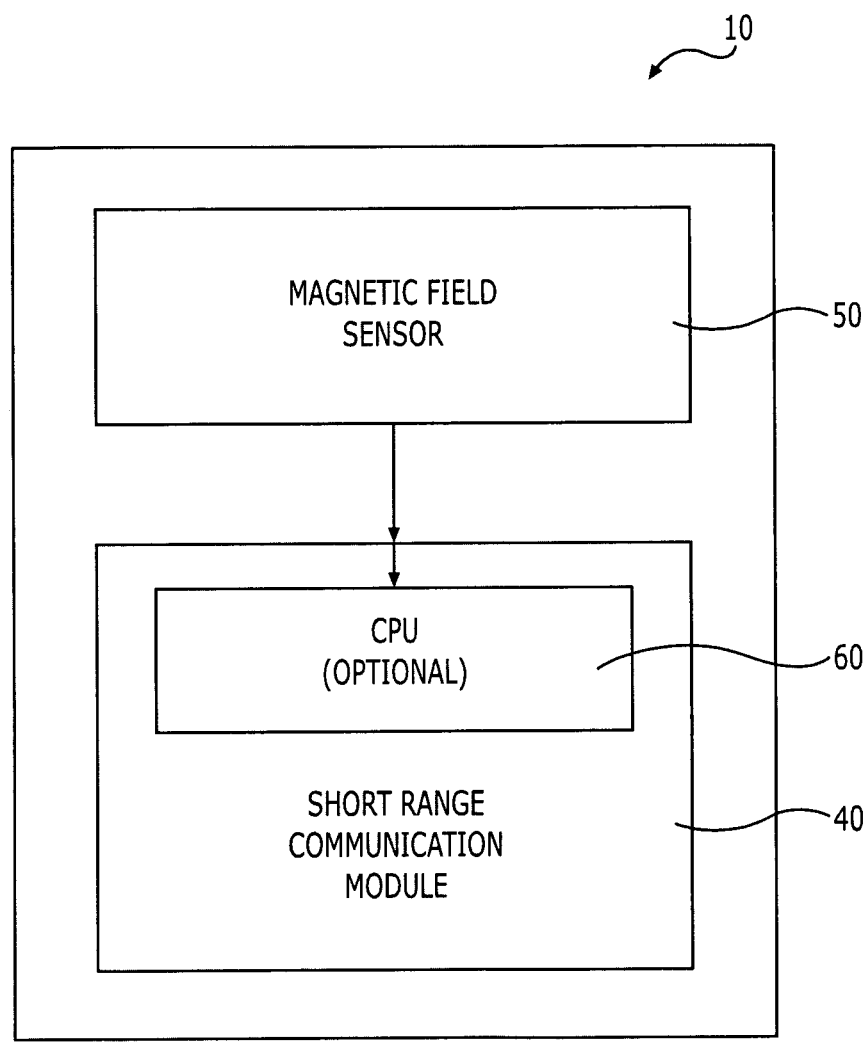
Figure 3:
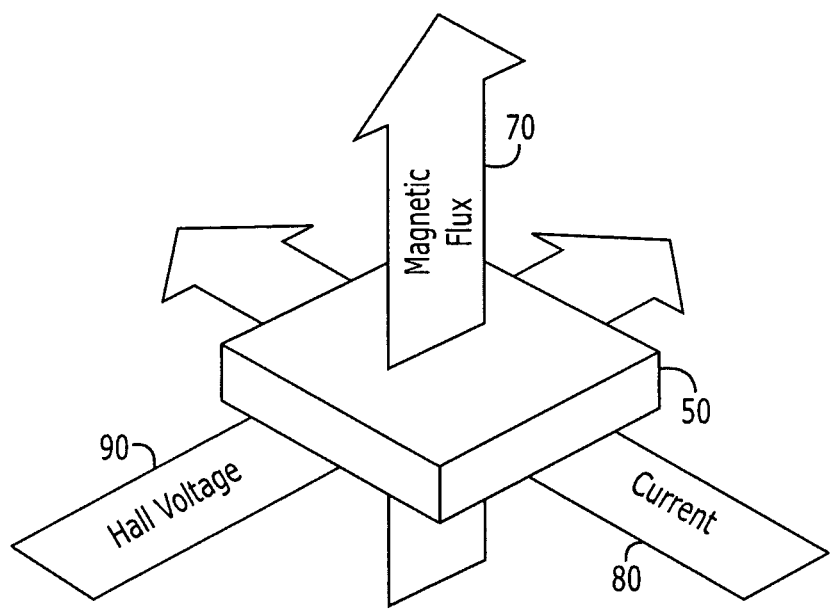

FIG. 2 is a schematic block diagram of a simplified mobile terminal, in accordance with one embodiment of the present invention;

FIG. 3 is a schematic block diagram of the of the principle behind a Hall Effect sensor utilized in the sensing of magnetic fields, in accordance with an embodiment of the present invention.

Figure 4:
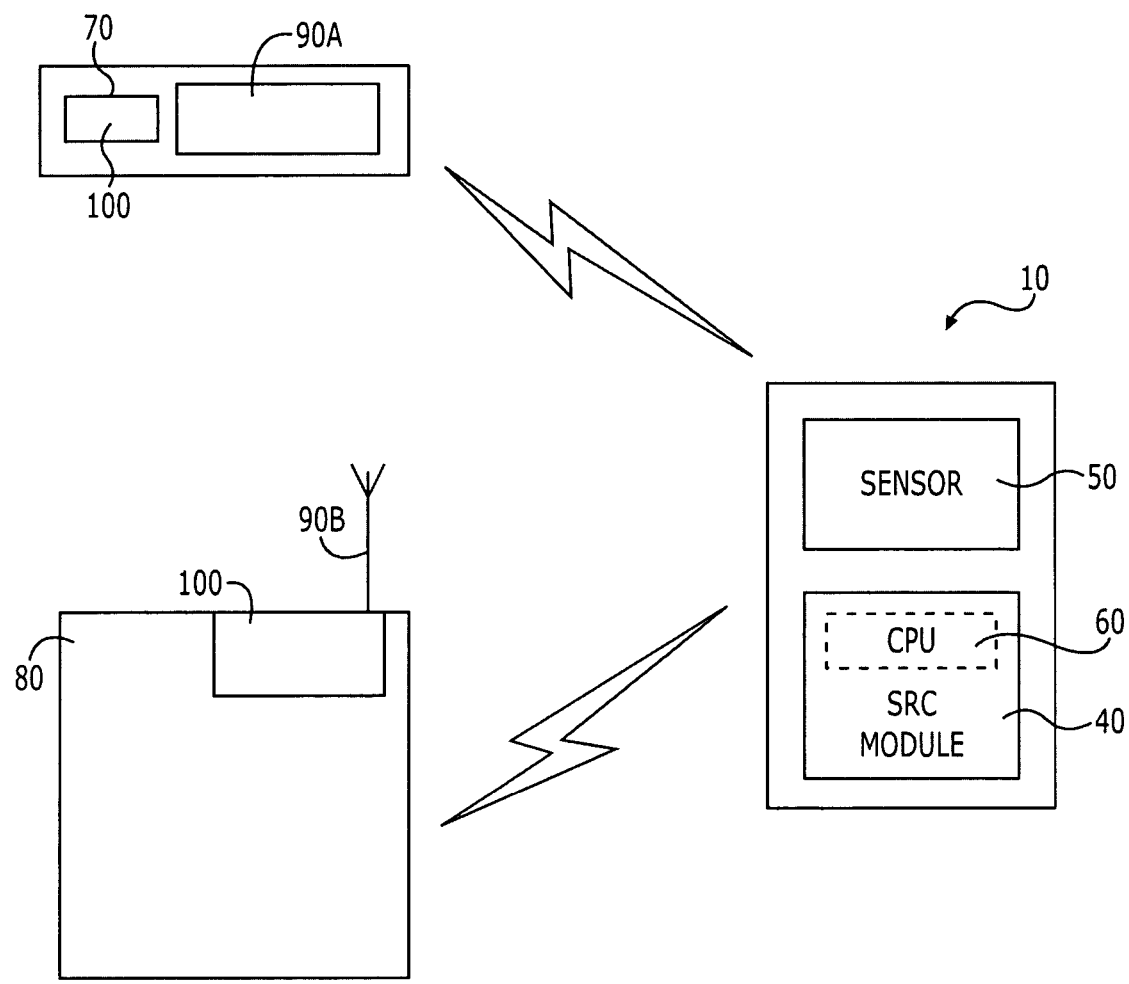

FIG. 4 is a schematic block diagram of a simplified system for short-range communication, in accordance with an embodiment of the present invention.

Figure 5:
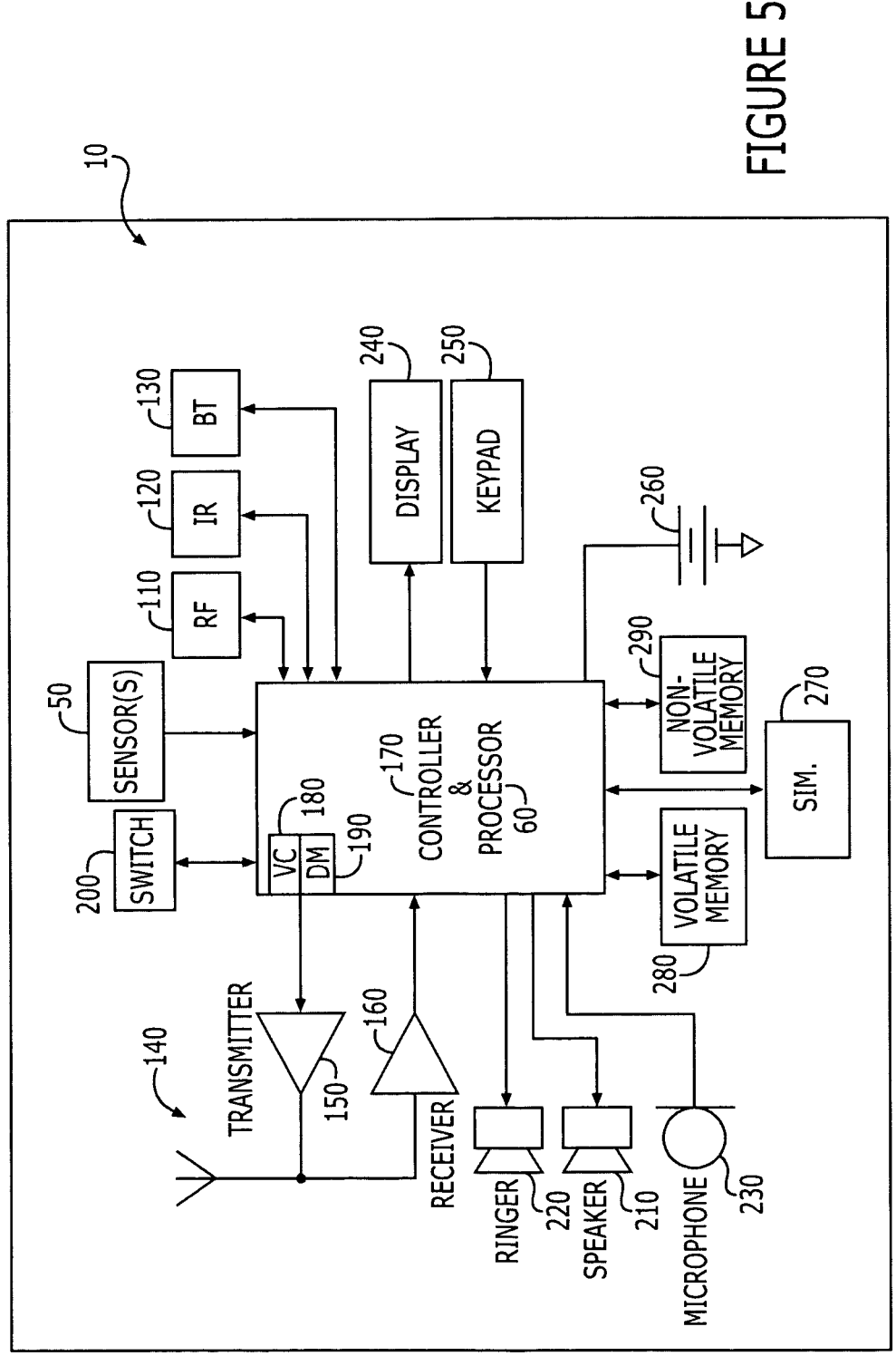

FIG. 5 is a schematic block diagram of a detailed mobile terminal, in accordance with an embodiment of the present invention.

Figure 6:
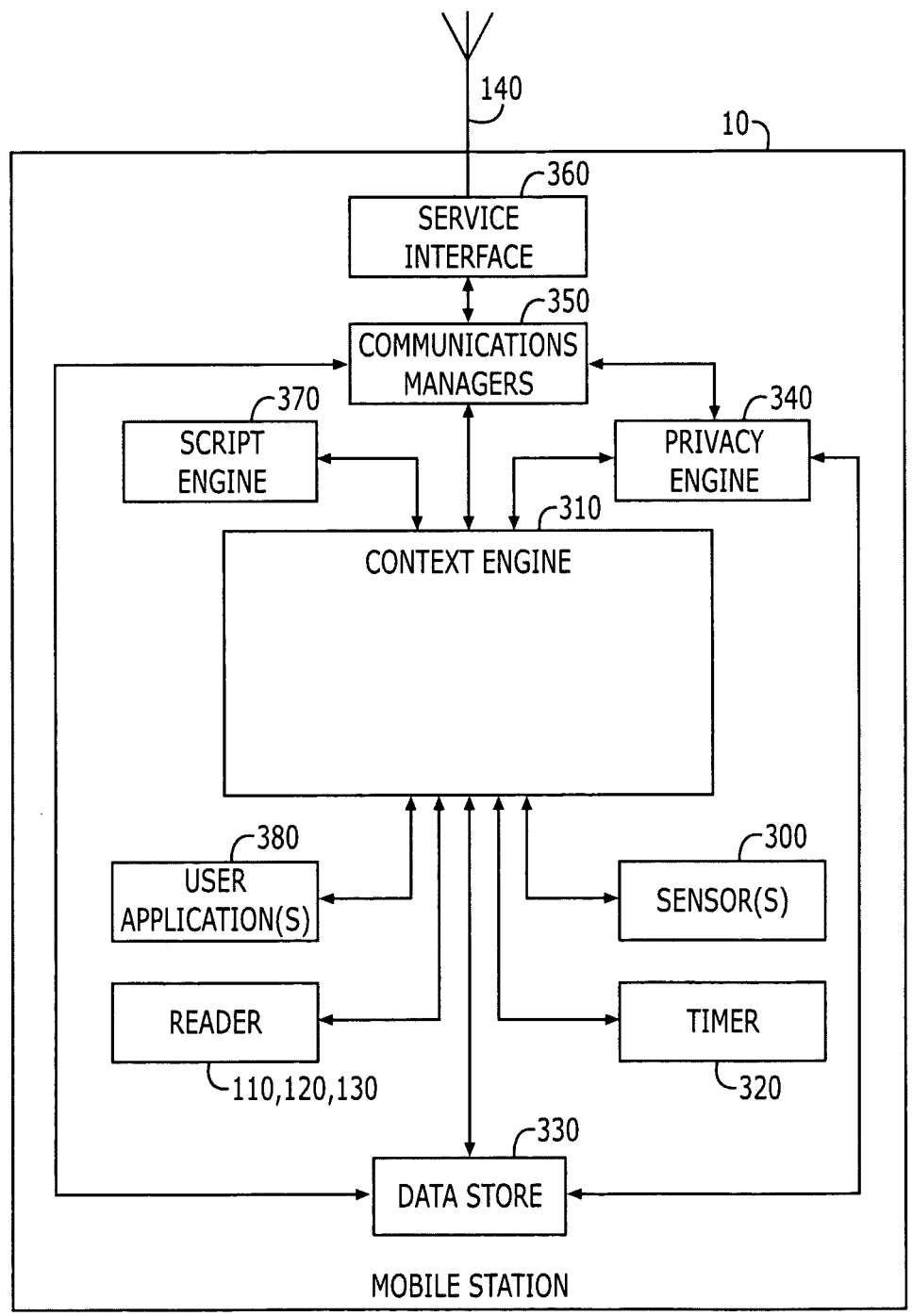
Figure 7:
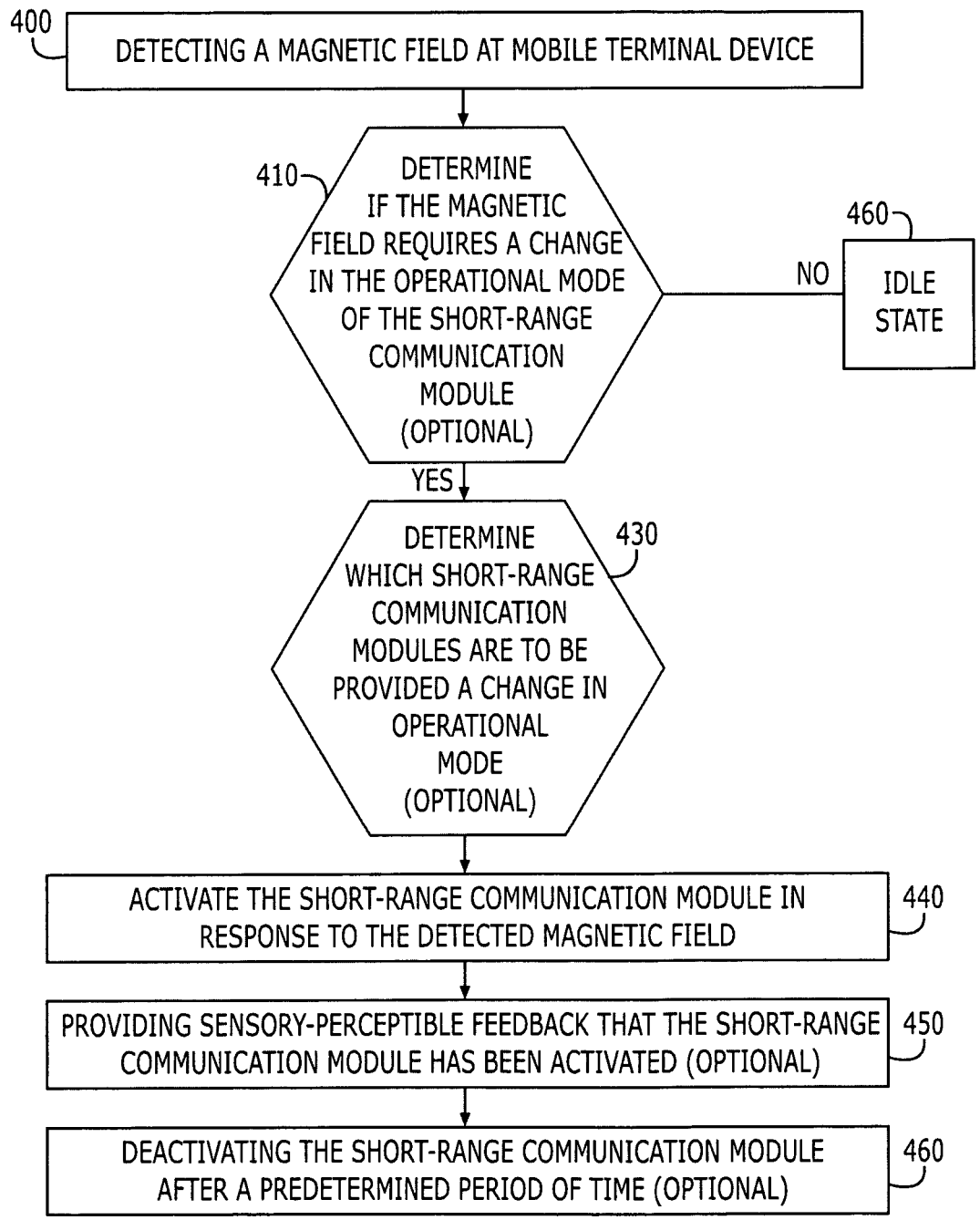

FIG. 6 is a schematic block diagram of context exchange architecture in a mobile terminal, in accordance with one embodiment of the present invention;

FIG. 7 is a flowchart illustrating various steps in a method for activating a short-range communication transceiver associated with a mobile terminal, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is defined by methods, devices, systems and computer programs that provide for greater conservation of power in mobile terminal devices that implement short-range communication modules. In particular, the present invention relies on magnetic field detection to activate the short-range communication modules. Short-range communication transponders, such as passive or active tags are equipped with a magnetic field generator and the receiving device, typically a mobile terminal device, is equipped with a magnetic field detector, such as a Hall Effect sensor or the like, that upon detection activates the short-range communication module. As such the present invention is able to limit the active period of the short-range communication module, thereby conserving power in the device associated with the module.

Referring to FIG. 1, a block diagram is provided of a communication network 100 that implements a mobile terminal having short-range communication capabilities. Such a mobile terminal will generally benefit from the embodiment of the present invention. As disclosed, the system, device and method embodiments of the present invention will be primarily described in conjunction with mobile communications applications. It should be understood, however, that the systems, terminals and methods of the present invention may be utilized in conjunction with a variety of other applications, both in the mobile communication environment and outside of the mobile communication environment. For example, the system, device and method of the present invention can be utilized in conjunction with wireline and/or wireless network applications.

Referring to FIG. 1, a mobile terminal device 10 may include an antenna 12 for transmitting signals to and for receiving signals from a base site or base station (BS) 14. The base station is a part of a cellular network that includes elements required to operate the network, such as a mobile switching center (MSC) 16. As is known by those of ordinary skill in the art of telecommunications, the cellular network may also be referred to as a Base Station, Mobile Switching Center and Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown); the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the mobile terminal device 10 via the Internet. For example, the processing elements can include one or more processing elements associated with an origin server 24.

In addition to cellular network communication, the terminal 10 may be equipped to communicate with other devices via short-range communication techniques. In the FIG. 1 embodiment the terminal 10 is in wireless short-range communication with transponder (i.e., tag) 26 and device 28 equipped with internal short-range communication transceiver 30. As will be appreciated, the electronic devices and transponders can comprise any of a number of different known devices and transponders capable of transmitting and/or receiving data in accordance with any of a number of different short-range communication techniques. For example, the short-range communication technique may include RFID, Bluetooth®, Infrared (IR), Wireless Local Area Network (WLAN), IrDA (Infrared Data Association) or the like. The electronic device 28 may include any of a number of different mobile or stationary devices, including other mobile terminals, and wireless accessories, portable digital assistants (PDAs), pagers, laptop computers and other types of electronic systems. Likewise, for example, the transponders can comprise Radio Frequency Identification (RFID) tags or the like.

Reference is now made to FIG. 2, a simplified block diagram of a mobile terminal device, in accordance with an embodiment of the present invention. The mobile terminal device 10 will include a short-range communication module 40 and a magnetic field sensor 50 in communication with the short-range communication module. The magnetic field sensor will detect a requisite magnetic field and will activate the short-range communication module from a power save or off-state to an active or semi-active state in response to detection of the magnetic field.

The short-range communication module 40 may take the form of an RFID module, a WLAN module, a Bluetooth® module (i.e., short-range communication in the 2.4 GHz frequency band), an IR module or the like. The module will typically include an antenna, a transceiver and a reader, all of which are not shown in the simplified FIG. 2 illustration. The module may optionally include processor 60 that is implemented if processing is required by the module. Such processing may include a determination of whether the detected magnetic field warrants activation of the short-range communication module. Since the device may come in contact with other magnetic fields that are not originated from short-range communication sources, the device may have a need to determine if the magnetic field warrants activation of the module, i.e., a high probability exists that it is being transmitted from a short-range communication source. More detailed description of the optional processor and the activation determination process will be described infra.

The magnetic field sensor 50 may take the form of a Hall Effect sensor or any other conventional means of magnetic field detection may be implemented. FIG. 3 provides an illustration of the basic concept of the Hall Effect sensor. The Hall Effect sensor 50 operates by making use of the Hall Effect, wherein, within a magnetic field 70 an electric current 80 flows in perpendicular direction of the magnetic field. The magnetic field exerts a transverse force on the moving charge carriers which tends to push them to one side of the conductor, resulting in a voltage 90 (i.e., the Hall voltage) that is generated transversely to the current flow direction. The Hall Effect sensor may take the form of a thin platelet of semiconductor material, such as silicon or gallium arsenide. As such, the Hall Effect sensor provides for a low-cost switching device for sensing magnetic fields.

FIG. 4 provides a simplified block diagram of a system for short-range communication, in accordance with an embodiment of the present invention. The system includes a mobile terminal device 10 that includes a short-range communication module 40 and a magnetic field sensor 50 in communication with the short-range communication module. The sensor will detect a magnetic field and, in response to detection of the magnetic field, provides an operational mode-changing input to the short-range communication module. The module may additionally include a processor for determining if the detected magnetic field requires an operational mode-changing input to the short-range communication module. The system will additionally include a short-range communication apparatus, such as, for example, a passive tag 70 or an additional mobile terminal device 80. The short-range communication apparatus will include a magnetic field generator 90. In the tag apparatus the magnetic field generator may take the form of one or more magnets 90A and in the mobile terminal device the magnetic field generator may take the form of the antenna 90B. According to one embodiment of the present invention, the short-range communication apparatus additionally includes a transponder 100 that communicates a short-range communication to the mobile terminal device 10, typically upon interrogation by the device. According to another embodiment of the present invention, the short-range communication apparatus additionally includes a short-range communication module (not shown), such as, for example an RFID reader that is capable of communicating a short-range communication to the mobile terminal device upon interrogation by the device.

Reference is now made to FIG. 5, a more detailed block diagram of mobile terminal device 10 that incorporates short-range communication activation in response of magnetic field detection, in accordance with an embodiment of the present invention. It should be understood, however, that the mobile terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The mobile terminal will include one or more short-range communication equipment, such as RFID reader 110, IR transceiver module 120 and Bluetooth® transceiver module 130, in addition to other short-range communication equipment not shown in FIG. 4. As an example, Bluetooth® (BT) transceiver 130 operates using Bluetooth® brand wireless technology developed by the Bluetooth Special Interest Group. Bluetooth® transmissions are categorized as operating in the 2.4 GHz range frequency band. The transceiver modules, in addition to the antenna 140, the transmitter 150 and receiver 160 (i.e., transceiver) collectively form the short-range communication module depicted in FIG. 1. As previously noted the processor 60 may also be included within the short range-communication module. The short-range communication modules provided the basis for sharing and/or obtaining data via short-range communication from electronic devices 28, transponder 26 (see FIG. 1) or the like. In some embodiments of the mobile terminal device of the present invention, the short-range communication equipment may be embodied in the processor 60, the controller 170 or the combined processor/controller.

The short-range communication equipment 110, 120, 130 may be associated with the mobile terminal in any manner known to those skilled in the art. For example, in some embodiments, the short-range communication equipment may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or transponders. Although not shown, the mobile terminal may additionally or alternatively be capable of transmitting and/or receiving data from electronic devices and/or transponders according to a number of different wireless networking techniques, including, but not limited to, for example, WLAN techniques such as IEEE 802.11 techniques or the like.

In addition to providing for short-range communication, the antenna 140, transmitter 150, receiver 160, controller 170, and processor 60 will typically provide the basis for transmitting and receiving cellular network signals. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal may be capable of operating in accordance with any of a number of first generation (1G), second generation (2G), 2.5G and/or third-generation (3G) communication protocols or the like. For example, the mobile terminal may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode telephones (e.g., digital/analog or TDMA/CDMA/analog telephones). In some embodiments of the mobile terminal, such as the depicted in FIG. 2, the processor 60 and the controller 170 will be configured as a single unitary device, while in other embodiments the processor and the controller may be stand-alone devices.

It should be noted that FIG. 5 illustrates the functional parts of the mobile terminal device 10, so that the antenna 140, transmitter 150 and receiver 160 are typically separated for each communication medium so that the antenna 140, transmitter 150 and receiver 160 for transmitting and receiving cellular network signals is different than the antenna 140, transmitter 150 and receiver 160 for communicating using Bluetooth®.

It is understood that the controller 170 includes the circuitry required for implementing the audio and logic functions of the mobile terminal. For example, the controller may be comprised of a Digital Signal Processor (DSP) device, a microprocessor device, various analog-to-digital converters, digital-to-analog converters, and other support circuits. The control and signal processing functions of the mobile terminal are allocated between these devices according to their respective capabilities. The controller may additionally include an internal voice coder (VC) 180, and may include an internal data modem (DM) 190. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal will also include one or more magnetic field sensors 50. The magnetic field sensor, according to one embodiment of the present invention, is a Hall Effect sensor. The sensor will detect magnetic field emission that is transmitted from a short-range communication source, such as a tag or the transceiver of a similar mobile terminal. It should be noted that also other means for sensing the magnetic field can be used, such as for example a Reed switch, which typically consists of a pair of flexible, ferromagnetic contacts hermetically sealed in an inert gas filled container. The magnetic field magnetizes the contacts and causes them to attract each other, closing the circuit to provide output signal for magnetic field detection. The mobile terminal 10 may also include a switch 200 that is in communication with and under the control of the controller 170. As such, the switch 200 may be included in the controller 170 or separate from, but in communication with, the controller 170, such as via any type of wireline and/or wireless techniques known to those skilled in the art. In addition to other functions, the switch 200 is capable of changing an operational mode of any of the short-range communication readers 110, 120 and 130. The detection of the magnetic field by the sensors 50 will affect a change in the switch 200, which in turn affects the operational mode of a short-range reader, such as readers 110, 120 and/or 130, such as by activating the transceiver or increasing the frequency of its operation For example, in one embodiment, detection of the magnetic field by sensor 50 may affect a change in the switch 200 that changes the operational mode of one of readers from a low-power "sleep" mode to a full-power active mode. In other embodiments, the switch 200 may change the operational mode of any one of the short-range communication units among any other operational modes known to those skilled in the art.

The mobile terminal may also comprise a user interface including a conventional earphone or speaker 210, a ringer 220, a microphone 230, a display 240, and a user input interface, such as keypad 250, all of which are coupled to the controller 170. The user input interface, which allows the mobile terminal to receive data, can comprise any of a number of devices allowing the mobile terminal to receive data, such as a keypad 250, a touch display (not shown) or other input device. In embodiments including a keypad, the keypad includes the conventional numeric (0-9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

The mobile terminal will typically also include a battery 260, such as a vibrating battery pack, for powering the various circuits that are required to operate the mobile terminal, as well as optionally providing mechanical vibration as a detectable output. For example, the battery 260 may provide, at least a portion of, the power required to operate any and all of the short-range communication units 110, 120 and 130.

The mobile terminal may further include memory, such as a subscriber identity module (SIM) 270, a removable user identity module (R-UIM) or the like, which typically stores information elements related to a mobile subscriber. In addition to the SIM, the mobile terminal may include other removable and/or fixed memory. In this regard, the mobile terminal may include volatile memory 280, such as volatile Random Access Memory (RAM) including a cache area for the temporary storage of data. The mobile terminal may also include other non-volatile memory 290, which may be embedded and/or may be removable. The non-volatile memory may additionally or alternatively comprise an EEPROM, flash memory or the like. The memories may store any of a number of pieces of information, and data, used by the mobile terminal to implement the functions of the mobile terminal. The memories may also store one or more applications capable of operating on the mobile terminal.

In one embodiment of the invention, the processor 60 may rely on mobile terminal parameters, i.e., measured and/or sensed data, to determine whether the detected magnetic field requires activation of the short-range communication module. The mobile terminal device will typically encounter various magnetic fields that are not associated with short-range communication sources. As such, the detection of the magnetic fields not associated with short-range communication sources will not require the activation of the module. In this regard, other sensors such as motion sensors or the like (not shown in FIG. 5) may be in communication with the processor and provide the processor with mobile terminal parameter data. For example, a motion sensor would provide an input to the processor that the device is either in motion or stationary. In this regard, the measured and/or sensed data may then be utilized, by the processor, to determine a context and/or change in context of the mobile terminal. The measured and/or sensed data may be transmitted according to one exemplary embodiment to a central blackboard that delegates the determined changes in the context to different destinations, such as the RFID reader 110, the infrared reader 120, or the Bluetooth® reader 130, utilizing context exchange architecture. Alternatively, the sensed data may be transmitted and interpreted by any other suitable application capable of providing the necessary signal to switch 60.

Once the reader has been activated, the terminal may optionally be provided with a means for tactically notifying the user of the mobile terminal that the short-range communication module has been activated or that the operational mode has been altered. The means for notifying the user may include vibration pulse feedback, audio feedback, visual feedback or any other suitable means for tactically providing feedback to the user that the short-range communication module is active.

FIG. 6 illustrates context exchange architecture in a mobile terminal 10 to determine a context and/or change in context of the mobile terminal, in accordance with one embodiment of the present invention. As previously noted, context information may be used by the present invention in determining whether the short-range communication module should be activated based on detection of a magnetic field. For more information related to managing context-related information in a mobile terminal device, see U.S. patent application Ser. No. 10/817,401, entitled "System, Mobile Station, Method and Computer Program Product for Managing Context-Related Information", filed Apr. 2, 2004, and assigned to the same inventive entity as the present invention. This application is herein incorporated by reference as if set forth fully herein. The context exchange architecture provides a means for implementing the magnetic field sensors of the present invention. The implementation of the content exchange architecture should not be interpreted as limiting the present invention; other sensing interpretation means may also be implemented without departing from the inventive concepts herein disclosed.

As shown in FIG. 6, the context exchange architecture of the mobile terminal 10 according to one embodiment of the present invention includes one or more sensors 300 that are capable of providing measured and/or sensed data, as described above. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc. For example, a motion sensor can measure the acceleration of the mobile terminal 10, and thereafter process the acceleration information into a context atom. The context exchange architecture of the mobile terminal 10 also includes a context engine 310, which is capable of receiving, and thereafter storing, context atoms provided to the context engine from the various internal or external context sources, including the sensors 300 and the short-range communication readers 110, 110 and 120. The timer 320 is in communication with the context engine and generally tracks the time between determinations of a change in context of the mobile terminal 10. In other embodiments of the mobile terminal 10, the timer 320 may be included in the context engine 310.

The context exchange architecture further includes a data store 330 coupled to the context engine 310. The data store is capable of storing information such as, for example, user preferences, profile information, as well as permissions for a privacy engine 340, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile terminal 10 is queried for an action to be performed in accordance with embodiments of the present invention, the privacy engine can indicate whether the action is allowed by comparing the querying entity to the list of friends. In addition to the sources of context-related information within the mobile terminal 10 (e.g., sensors 300, readers 110, 120 and 130 and other data measuring elements), the context exchange architecture can provide for receiving context-related information from sources outside the mobile terminal. In this regard, the context exchange architecture includes a communications manager 350, which can identify other context sources located within a communication distance from the mobile terminal. In addition to identifying the other context sources, the communications manager can initiate contact with such context sources and, in general, provide housekeeping for communications with such context sources. The communications manager can also function as a firewall (along with the privacy engine 340). Advantageously, the communications manager can abstract different connection types to the context engine 310 such that context atoms within the context engine can be stored and/or retrieved regardless of whether the communications manager communicates with other context sources via Bluetooth®, GPRS, RFID, USB, or some other link type.

To facilitate the mobile terminal 10 communicating with the cellular network, data network and/or other electronic devices 28 (see FIG. 1); the context exchange architecture also includes a service interface 360. The service interface can comprise, for example, an over-the-air interface, as well as the underlying transport protocols (e.g., Ethernet, GPRS, TCP/IP). The context exchange architecture also provides a context exchange protocol. Generally, the context exchange protocol comprises a standardized protocol that allows different entities to exchange context atoms in a secure and reliable fashion, regardless of underlying architecture or transmission channel.

The context exchange architecture can additionally provide for creating new context atoms, as well as deleting and/or modifying existing context atoms. In this regard, the context exchange architecture can include a script engine 370, which can store rules and conditions. In one advantageous embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. The script engine can further specify requirements of the conditions to transmit a notification. For example, the script engine can specify conditions such as "transmit a notification only when the value change by more than 20%." In one embodiment, for example, the rules can comprise one or more Java classes that include executable code defining the conditions of the rules, and/or extensible markup language (XML) scripts that include Boolean logic defining the conditions of the rules.

Each context rule typically includes one or more conditions and one or more actions to be performed when the conditions are satisfied. In this regard, the conditions of the context rules are typically related to the context atoms, or more particularly, the values in the context atoms. The script engine 370 can execute any of a number of different context rules that include any of a number of different actions. Context rules can be exchanged between the mobile terminal 10 and other devices, such as electronic devices 28, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile terminal.

The elements of the architecture have been described independent of the mobile terminal block diagram of FIG. 4. It should be understood, however, that the architecture of embodiments of the present invention, such as are illustrated in FIG. 5, are capable of being performed by a mobile terminal that includes the elements illustrated in FIG. 4. In this regard, at least a portion of the elements of the architecture are capable of being embodied in corresponding elements illustrated in FIG. 4. For example, the data store 330 is capable of being embodied in memory such as SIM 270, volatile memory 280 and/or non-volatile memory 290. Also, the functions of the context engine 310, script engine 370, privacy engine 340 and/or communications manager 350 are capable of being performed by controller 170 and/or processor 60. Additionally, or alternatively, one or more of the elements of the architecture of embodiments of the present invention can be performed by, and/or mirrored by, other elements of the cellular network and/or the data network of FIG. 1.

FIG. 7 provides for a flow diagram of a method for activating a short-range communication module associated with a mobile terminal device, in accordance with an embodiment of the present invention. At step 400, magnetic field is detected at the mobile terminal. Typically, a Hall Effect sensor or a similar sensor will be implemented at the mobile terminal as a means of detecting the magnetic field. At optional step 410, a determination may be made to determine whether the detection of the magnetic field requires changing the operational state of the short-range communication module. In some embodiments, detection of the magnetic field alone will not trigger the activation of the short-range communication module. This is because the mobile terminal will come in contact with numerous magnetic fields, many of which would not be associated with a short-range communication. In order to eliminate the likelihood that the module is activated in instances in which no short-range communication is forthcoming, optional step 410 may be employed. The determination will typically involve processing mobile terminal secondary parameter data to assess the likelihood that the sensed magnetic field is coming from a short-range communication source. Examples of such secondary parameter information or data include the operational state of the terminal device, i.e., whether the device is in a sleep mode or an active mode, contextual information.

If the determination indicates that the detected magnetic field does not require a change in the operational state of the short-range communication module, then at step 420, no change is made and the short-range communication module remains in an idle mode, inactive mode, sleep mode, low operation mode or the like. If a determination is made that the detected magnetic filed does require a change in the operational state of the short-range communication module then, at optional step 430, a determination may be made as to which of the short-range communication modules will be provided an operational mode changing signal. For example, it may be possible to differentiate amongst magnetic fields based on the magnetic flux angle, such that a magnetic flux angle of one type effects a change in the operational state of one type of short-range communication module and magnetic flux angles of other types effect a change in the operational state of other types of short-range communication modules. This step would be obviated if the mobile terminal device only includes one type of short-range communication linked to the magnetic field detection.

At step 440, the short-range communication module is activated either in direct response to detection of the magnetic field or after the determination is made that activation is required based on the likelihood that the magnetic field is being transmitted for a short-range communication source. At optional step 450, the activation of the short-range communication module may coincide with the providing the device sensory-perceptible feedback that the short-range communication module has been activated. The sensory-perceptible feedback may take the form of vibrational feedback, audio feedback visual feedback or the like. The method may culminate with optional step 460, the deactivation of the short-range communication module after a predetermined period of time, after a user input or after confirmation that the short-range communication has been successfully captured.

In this regard, FIG. 7 provides for methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the method, terminal and computer program product of the present invention are capable of adjusting the power consumption of a short-range communication module that are associated with mobile terminals based upon the detection of a magnetic field and the determination that the magnetic field is being transmitted from a short-range communication source. The short-range communication module, therefore, uses less power because active scanning by the transceiver(s) is only undertaken when the sensors detect a magnetic field and, optionally, when the terminal determines that the likely source of the magnetic field. As such, other than when the mobile terminal has detected a magnetic field, the transceivers associated with mobile terminals operate at relatively low power levels or remain inactive. Due to the adjustment of power consumption by short-range transceivers, the present invention conserves power of the mobile terminals associated with transceivers, which permits the mobile terminals and the transceivers to operate longer without requiring charging or replacement of the power supply as compared to mobile terminals associated with transceivers that do not use these techniques.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor, cause the apparatus to perform at least the following:
   facilitate communications with a radio frequency identification (RFID) reader and a magnetic field sensor that is configured to communicate with the RFID reader, the magnetic field sensor configured to detect a magnetic field;
   determine whether the detection of the magnetic field requires changing an operational state of the RFID reader based in part on analyzing one or more specified items of terminal parameter data indicating whether the apparatus is in motion or is stationary; and
   facilitate provision of an operational mode-changing input to the RFID reader in response to determining that the detection of the magnetic field requires changing the operational state of the RFID reader, wherein the RFID reader, upon receiving the operational mode-changing input, is configured to change an operational mode from a first non-zero RFID interrogation frequency to a second RFID interrogation frequency that is substantially greater than the first non-zero RFID interrogation frequency.

2. The apparatus of claim 1, wherein the at least one memory and the computer program code are configured to, with the at least one processor, cause the apparatus to:
   facilitate receipt of contextual information from a contextual information module; and
   facilitate usage of the contextual information to determine that the sensed magnetic field requires the operational mode-changing input to the RFID reader.

3. The apparatus of claim 1, wherein the magnetic field sensor comprises a Hall Effect sensor.

4. The apparatus of claim 1, wherein the operational mode-changing input provided to the RFID reader comprises an active operation mode input.

5. The apparatus of claim 1, wherein the RFID reader comprises an RFID transceiver.

6. The apparatus of claim 5, wherein the operational mode-changing input provided by the apparatus to the RFID transceiver induces the RFID reader transceiver to transmit an interrogation signal.

7. The apparatus of claim 5, wherein the at least one memory and the computer program code are configured to, with the at least one processor, cause the apparatus to:
   induce the RFID reader transceiver to increase the frequency of interrogation signal transmissions in response to providing the operational mode-changing input to the RFID transceiver.

8. The apparatus of claim 4, wherein the at least one memory and the computer program code are configured to, with the at least one processor, cause the apparatus to:
   limit the operational mode-changing input provided to the RFID reader to a predefined time period.

9. A method comprising:
   facilitating communications with a radio frequency identification (RFID) reader and a magnetic field sensor that is configured to detect a magnetic field at an apparatus;
   determine whether the detection of the magnetic field requires changing an operational state of the RFID reader based in part on analyzing one or more specified items of terminal parameter data indicating whether the apparatus is in motion or is stationary;
   facilitating provision of an operational mode-changing input to the RFID reader in response to determining that the detection of the magnetic field requires changing the operational state of the RFID reader, wherein the RFID reader, upon receiving the operational mode-changing input, is configured to change an operational mode from a first non-zero RFID interrogation frequency to a second RFID interrogation frequency that is substantially greater than the first non-zero RFID interrogation frequency.

10. The method of claim 9, wherein determining whether the detection of the magnetic field requires changing the operational state of the RFID reader module prior to changing the mode further comprises facilitating usage of contextual information associated with the apparatus to determine whether the operational state of the RFID reader requires changing.

11. The method of claim 9, wherein detect the magnetic field at the apparatus further comprises facilitating detection of the magnetic field at a Hall Effect sensor disposed within the apparatus.

12. The method of claim 9, further comprising deactivating the RFID reader after a predefined time period.

13. The method of claim 9, further comprising facilitating provision of sensory-perceptible feedback to the apparatus, the sensory perceptible feedback indicates that the RFID reader has been activated.

14. The method of claim 13, wherein facilitating provision of the sensory-perceptible feedback to the apparatus, further comprises facilitating provision of sensory-perceptible feedback chosen from the group consisting of vibrational feedback, audio feedback and visual feedback.

15. The method of claim 9, further comprising activating the RFID reader associated with the apparatus in response to detection of the magnetic field further in response to activating an RFID transceiver to transmit an interrogation signal.

16. The method of claim 15, wherein activating the RFID reader associated with the apparatus in response to detection of the magnetic field further comprises increasing the frequency of interrogation signal transmissions transmitted by an RFID transceiver.

17. A system comprising:
   a first device comprising:
   a radio frequency identification (RFID) reader; and
   a magnetic field sensor configured to:

facilitate communications with the RFID reader that detects a magnetic field and, in response to detection of the magnetic field, the first device is configured to determine whether the detection of the magnetic field requires changing an operational state of the RFID reader based in part on analyzing one or more specified items of terminal parameter data indicating whether the first device is in motion or is stationary; and facilitate provision of an operational mode-changing input to the RFID reader in response to a determination that the detection of the magnetic field requires changing the operational state of the RFID reader, wherein the RFID reader, upon receiving the operational mode-changing input, is configured to change an operational mode from a first non-zero RFID interrogation frequency to a second RFID interrogation frequency that is substantially greater than the first non-zero RFID interrogation frequency.

18. The system of claim 17, further comprising:
a short-range communication apparatus comprising:
a magnetic field generator that is configured to generate a magnetic field to the first device; and
a transponder that is configured to communicate a short-range communication to the first device,
wherein the short-range communication apparatus comprises a second device.

19. The system of claim 18, wherein the magnetic field generator comprises an antenna.

20. The system of claim 18, wherein the short-range communication apparatus comprises a passive tag device.

21. The system of claim 20, wherein the magnetic field generator comprises a magnet.

22. The system of claim 17, wherein the first device further comprises a contextual information module configured to facilitate communication of contextual information to a processor, wherein the processor is configured to facilitate usage of the contextual information to determine whether the sensed magnetic field requires an operational mode-changing input to the RFID reader.

23. The system of claim 17, wherein the first device comprises the magnetic field sensor and the sensor further comprises a Hall Effect sensor.

24. The system of claim 18, wherein the first device comprises the RFID reader and the short range communication apparatus comprises an RFID transceiver.

25. The system of claim 24, wherein the magnetic field sensor of the first device that facilitates provision of an operational mode-changing input to the RFID reader further defines the operational mode-changing input as an activation signal provided to the RFID transceiver that induces the RFID reader transceiver to transmit an interrogation signal.

26. The system of claim 24, wherein the magnetic field sensor of the first device that facilitates provision of an operational mode-changing input to the RFID reader further defines the operational mode-changing input as an increase to frequency of interrogation signal transmissions provided by the RFID transceiver.

27. A computer program product comprising a non-transitory computer-readable storage medium having computer-readable program code portions stored therein, the computer-readable program code portions comprising:
program code instructions configured to facilitate communications with a radio frequency identification (RFID) reader and a magnetic field sensor that is configured to communicate with the RFID reader, the magnetic field sensor configured to detect a magnetic field at an apparatus;

program code instructions configured to determine whether the detection of the magnetic field requires changing an operational state of the RFID reader based in part on analyzing one or more specified items of terminal parameter data indicating whether the apparatus is in motion or is stationary; and program code instructions configured to facilitate provision of an operational mode-changing input to the RFID reader in response to determining that the detection of the magnetic field requires changing the operational state of the RFID reader, wherein the RFID reader, upon receiving the operational mode-changing input is configured to change an operational mode from a first non-zero RFID interrogation frequency to a second RFID interrogation frequency that is substantially greater than the first non-zero RFID interrogation frequency.

28. The computer program product of claim 27, further comprising:
program code instructions configured to assess contextual information based on receipt of a sensed magnetic field.

29. The computer program product of claim 27, wherein analyzing the items of parameter data comprises assessing one or more terminal parameters based on receipt of a sensed magnetic field by a Hall Effect sensor.

30. The computer program product of claim 27, further comprising:
program code instructions configured to define the operational mode-changing signal as an activation signal that induces a transceiver to transmit an interrogation.

31. The computer program product of claim 27, further comprising:
program code instructions configured to define the operational mode-changing signal as a frequency changing signal that induces a transceiver to increase frequency of interrogation signal transmissions.

32. The apparatus of claim 1, wherein the first non-zero RFID interrogation frequency and the second RFID interrogation frequency are frequencies in which the RFID reader scans for RFID data.

33. The apparatus of claim 1, wherein the at least one memory and the computer program code are configured to, with the at least one processor, further cause the apparatus to:
determine that the sensed magnetic field requires the operational mode-changing input to the RFID reader based on a predetermined value corresponding to a measured magnetic field.

34. The apparatus of claim 33, wherein the at least one memory and the computer program code are configured to, with the at least one processor, instructions further cause the apparatus to:
determine that the RFID reader remains in an idle-state when the apparatus determines that a measurement of a magnetic field is below the predetermined value.

35. The apparatus of claim 1, wherein the RFID reader comprises a plurality of transceiver modules, and wherein when the apparatus determines that the sensed magnetic field requires the operational mode-changing input to the RFID reader, the at least one memory and the computer program code are configured to, with the at least one processor, cause the apparatus to:
determine at least one transceiver module among the plurality of transceiver modules in which to provide the operational mode-changing input.

36. The method of claim 9, wherein the first non-zero RFID interrogation frequency and the second RFID interrogation frequency are frequencies in which the RFID reader scans for RFID data.

37. The method of claim 9, wherein determining comprises determining that the detection of the magnetic field requires the operational mode-changing input to the RFID reader based on a predetermined value corresponding to a measured magnetic field.

38. The method of claim 37, further comprising:
determining that the RFID reader remains in an idle-state in an instance in which a measurement of a magnetic field is below the predetermined value.

39. The method of claim 9, further comprising: determining at least one transceiver module among a plurality of transceiver modules, of the RFID reader, in which to provide the operational mode-changing input.

40. The system of claim 17, wherein the first non-zero RFID interrogation frequency and the second RFID interrogation frequency are frequencies in which the RFID reader scans for radio RFID data.

41. The system of claim 21, wherein the first device is configured to determine that the sensed magnetic field requires the operational mode-changing input to the RFID reader based on a predetermined value corresponding to a measured magnetic field.

42. The system of claim 41, wherein in an instance in which the first device determines that a measurement of a magnetic field is below the predetermined value, the RFID reader remains in an idle-state.

43. The system of claim 21, wherein the RFID reader comprises a plurality of transceiver modules, and wherein in an instance in which the first device determines that the sensed magnetic field requires the operational mode-changing input to the RFID reader, the first device is configured to determine at least one transceiver module among the plurality of transceiver modules in which to provide the operational mode-changing input.

44. The computer program product of claim 27, wherein the first non-zero RFID interrogation frequency and the second RFID interrogation frequency are frequencies in which the RFID reader scans for RFID data.

45. The computer program product of claim 27, further comprising:
program code instructions configured to determine that the detection of the magnetic field requires the operational mode-changing input to the RFID reader based on a predetermined value corresponding to a measured magnetic field.

46. The computer program product of claim 45, further comprising:
program code instructions configured to determine that the RFID reader remains in an idle-state in response to determining that a measurement of a magnetic field is below the predetermined value.

47. The computer program product of claim 27, further comprising:
program code instructions configured to determine at least one transceiver module among a plurality of transceiver modules, of the RFID reader, in which to provide the operational mode-changing input in response to determining that the detection of the magnetic field requires the operational mode-changing input.

48. The apparatus of claim 1, wherein the at least one memory and the computer program product code are configured to, with the at least one processor, cause the apparatus to:
facilitate one or more transmissions of excitation signals at a first frequency, of the first non-zero RFID interrogation frequency, which triggers a transponder to send at least a first response.

49. The apparatus of claim 48, wherein the at least one memory and the computer program code are configured to, with the at least one processor, cause the apparatus to:
facilitate one or more transmissions of excitation signals at a second frequency, of the second RFID interrogation frequency, which triggers the transponder to send at least a second response.

50. The apparatus of claim 1, wherein the at least one memory and the computer program code are configured to, with the at least one processor, cause the apparatus to:
assess the detected magnetic field to determine a plurality of magnetic flux angles, wherein the mode-changing input is based on the assessment of at least one of the magnetic flux angles.

51. The apparatus of claim 50, wherein the at least one memory and the computer program code are configured to, with the at least one processor, cause the apparatus to:
facilitate usage of a first magnetic flux angle to activate a first module among a plurality of short range communication modules; and
facilitate usage of a second magnetic flux angle to activate a second module among the modules, wherein the first module comprises the RFID reader.

52. The apparatus of claim 2, wherein at least a portion of the contextual information comprises information identifying a location of the apparatus.

53. The method of claim 9, further comprising assessing the detected magnetic field to determine a plurality of magnetic flux angles, wherein the mode-changing input is based on the assessment of at least one of the magnetic flux angles.

54. The method of claim 53, further comprising:
facilitating usage of a first magnetic flux angle to activate a first module among a plurality of short range communication modules; and
facilitating usage of a second magnetic flux angle to activate a second module among the modules, wherein the first module comprises the RFID reader.

55. The method of claim 10, wherein at least a portion of the contextual information comprises information identifying a location of the apparatus.

56. The system of claim 17, wherein the magnetic field sensor is configured to assess the detection of the magnetic field to determine a plurality of magnetic flux angles, wherein the mode-changing input is based on the assessment of at least one of the magnetic flux angles.

57. The system of claim 56, wherein the magnetic field sensor is further configured to:
facilitate usage of a first magnetic flux angle to activate a first module among a plurality of short range communication modules; and
facilitate usage of a second magnetic flux angle to activate a second module among the modules, wherein the first module comprises the RFID reader.

58. The system of claim 22, wherein at least a portion of the contextual information comprises information identifying a location of the first device.

59. The computer program product of claim 27, further comprising program code instructions configured to:
assess the detection of the magnetic field to determine a plurality of magnetic flux angles, wherein the mode-changing input is based on the assessment of at least one of the magnetic flux angles.

60. The computer program product of claim 59, further comprising;
   program code instructions configured to facilitate usage of a first magnetic flux angle to activate a first module among a plurality of short range communication modules; and
   program code instructions configured to facilitate usage of a second magnetic flux angle to activate a second module among the modules, wherein the first module comprises the RFID reader.

61. The computer program product of claim 28, wherein at least a portion of the contextual information comprises information identifying a location of the apparatus.

62. The apparatus of claim 1, wherein the terminal parameter data comprises information indicating whether the apparatus is in a sleep mode or an active mode.

63. The method of claim 9, wherein the terminal parameter data comprises information indicating whether the apparatus is in a sleep mode or an active mode.

64. The system of claim 17, wherein the terminal parameter data comprises information indicating whether the first device is in a sleep mode or an active mode.

65. The computer program product of claim 27, wherein the terminal parameter data comprises information indicating whether the apparatus is in a sleep mode or an active mode.

* * * * *